Dec. 15, 1942.    G. R. DEMPSTER    2,305,148
TRANSPORTING AND DUMPING DEVICE
Filed Sept. 20, 1940    6 Sheets-Sheet 2

Inventor
George R. Dempster
By Cameron, Kerkam & Sutton
Attorneys

Dec. 15, 1942.   G. R. DEMPSTER   2,305,148
TRANSPORTING AND DUMPING DEVICE
Filed Sept. 20, 1940   6 Sheets-Sheet 5

Inventor
George R. Dempster

By Cameron, Kerkam + Sutton.
Attorneys

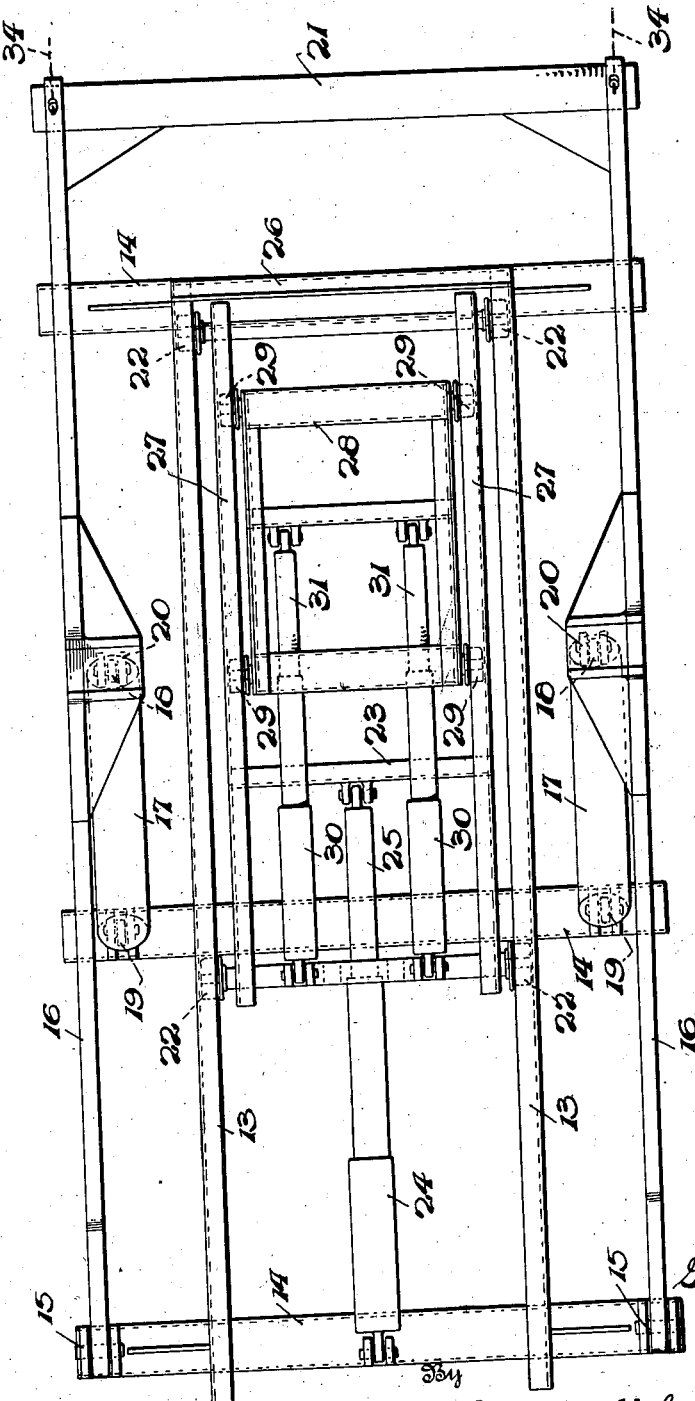

Patented Dec. 15, 1942

2,305,148

UNITED STATES PATENT OFFICE 2,305,148

TRANSPORTING AND DUMPING DEVICE

George R. Dempster, Knoxville, Tenn.

Application September 20, 1940, Serial No. 357,629

20 Claims. (Cl. 214—77)

This invention relates to transporting and dumping devices and more particularly to transporting and dumping devices by which one or more transporting and dumping containers can be transported and individually dumped.

More particularly still this invention relates to transporting and dumping devices by which one or more transporting and dumping containers can be transported and individually dumped, each transporting and dumping container acting as a skid for elevating the next transporting and dumping container and supporting the next transporting and dumping container during its dumping operation.

It is accordingly an object of the present invention to provide a novel transporting and dumping device by which one or more transporting and dumping containers can be transported and individually dumped.

Another object of the present invention is to provide a novel transporting and dumping device in which the first transporting and dumping container elevated for transportation acts as a skid for the next transporting and dumping container elevated for transportation.

Another object of the present invention is to provide a novel transporting and dumping device in which the first transporting and dumping container elevated for transportation supports the second transporting and dumping container elevated for transportation during the dumping operation of the second transporting and dumping container.

Another object of the present invention is to provide a novel transporting and dumping device in which each transporting and dumping container elevated for transportation acts as a skid for the next transporting and dumping container elevated for transportation.

Another object of the present invention is to provide a novel transporting and dumping device by which one or more transporting and dumping containers can be transported and individually dumped in which each transporting and dumping container supports the adjacent transporting and dumping container during its dumping operation.

Another object of the present invention is to provide a novel transporting and dumping device for the transportation and dumping of one or more transporting and dumping containers wherein a greatly increased load capacity is obtained without unduly increasing the bulk or weight of the device.

Another object of the present invention is to provide a novel transporting and dumping device by which one or more transporting and dumping containers can be transported and individually dumped which is of simple construction, rugged, durable, easy to operate and maintain, and relatively inexpensive to manufacture.

Other and further objects of the present invention will appear as the description thereof proceeds.

While the novel transporting and dumping device of the present invention is capable of many mechanical expressions and can be used to transport and dump more than two transporting and dumping containers, for the purposes of illustration the present invention is illustrated in the accompanying drawings and is hereafter described for use with two transporting and dumping containers. It is to be expressly understood that the embodiment of the present invention shown in the accompanying drawings and described hereafter for use with two transporting and dumping containers is shown and described for the purposes of illustration only and is not to be construed as limiting the scope of the present invention. To determine the breadth of the present invention reference should be had to the appended claims.

In the accompanying drawings, in which like reference characters indicate similar parts, Fig. 1 is a side view of an illustrative embodiment of the novel transporting and dumping device of the present invention showing the first transporting and dumping container raised to its elevated position;

Fig. 8 is a plan view of the truck assembly.

Figure 1:
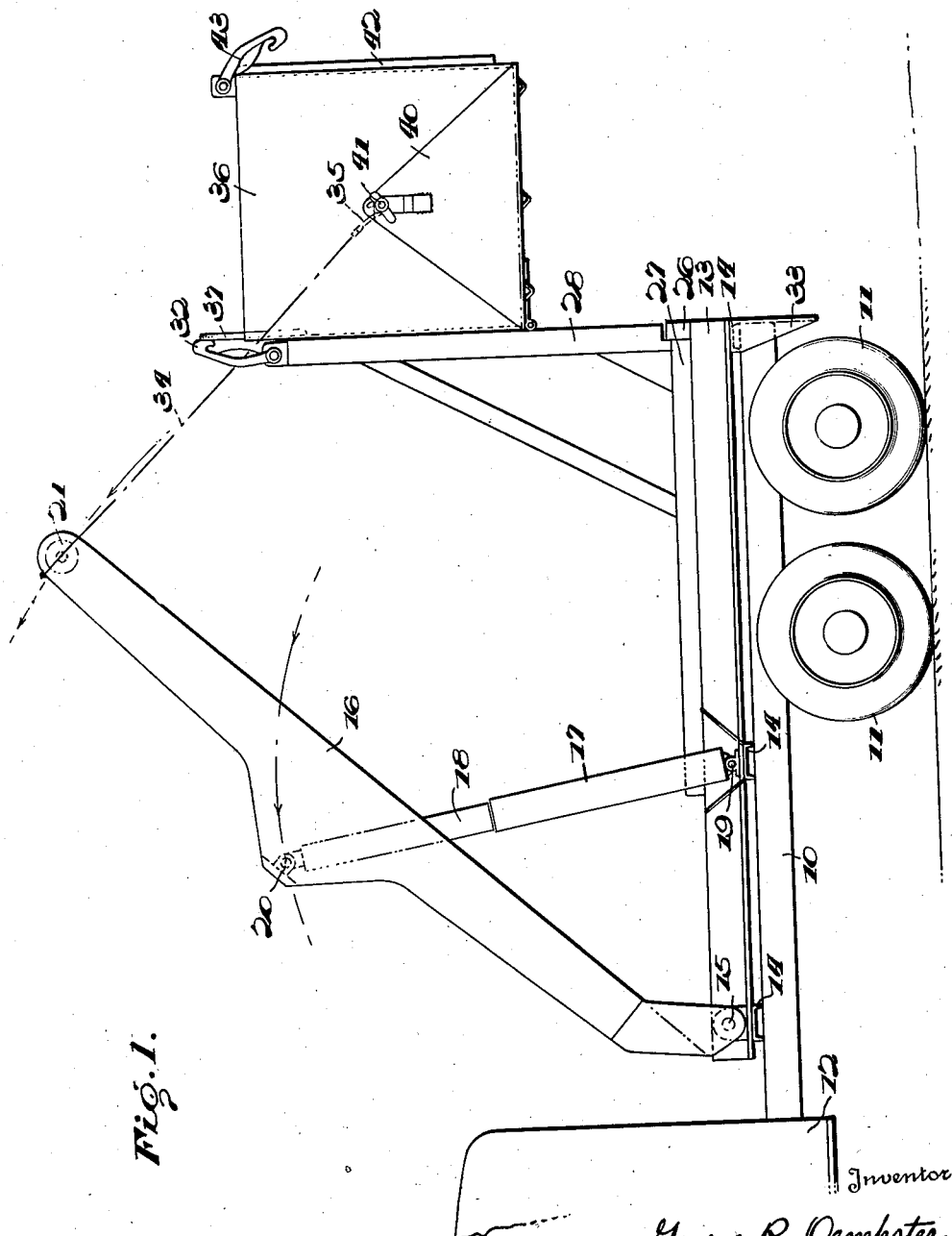

Referring now to the several figures and more particularly Figs. 1–5, 10 are the side bars of any suitable vehicle chassis supported by rear wheels 11 and provided with a cab 12. Suitably mounted on and secured to side bars 10 are longitudinally extending channel members 13 suitably spaced and reinforced by cross members 14. Pivotally mounted as at 15 on the forward cross member 14 are boom arms 16, each boom arm 16 being provided with an elevating cylinder 17 and associated piston 18, cylinders 17 being pivotally mounted at 19 to an intermediate cross member 14 and pistons 18 pivotally engaging boom arms 16 at 20. Boom arms 16 are joined at their outer extremities by a spreader and lifting arm 21.

Mounted for longitudinal movement in channel members 13 on rollers 22 (Fig. 5) is a platform 23 actuated by a suitable cylinder 24 and piston 25, piston 25 being connected to the forward end of platform 23 and cylinder 24 being connected to the forward end of the channel member-cross member assembly. A stop 26 is provided to limit the rearward movement of platform 23. Mounted on platform 23 are longitudinally extending channel members 27 in which a skid frame 28 is mounted for longitudinal movement on rollers 29. Cylinders 30 and pistons 31 are provided to actuate skid frame 28, pistons 31 being connected to skid frame 28 and cylinders 30 being connected to the forward end of platform 23. Pivotally mounted on the upper end of skid frame 28 is a suitable automatic hook or catch 32.

Suitably secured to the rear cross member 14 is a downwardly depending apron 33.

Connected to the extremities of the spreader and lifting arm 21 are lifting chains 34 terminating in suitable hooks 35.

Figure 6:
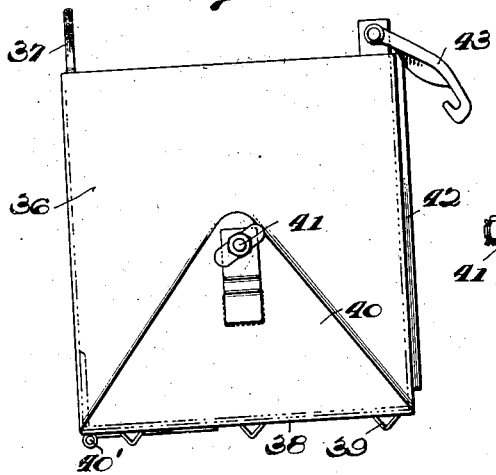
Fig. 6 is a side view of a novel transporting and dumping container for use with the embodiment of the present invention shown in Fig. 1.
Figure 7:
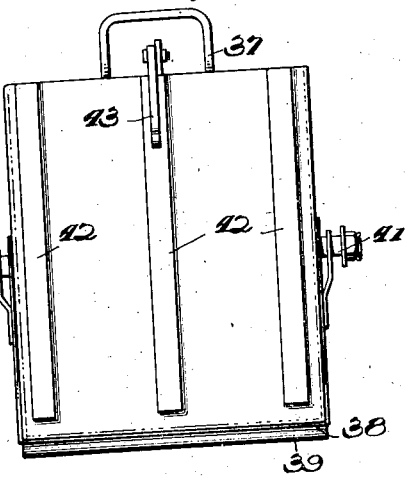
Fig. 7 is an end view of the novel transporting and dumping container of Fig. 6.

Referring more particularly now to Figs. 6 and 7, a suitable transporting and dumping container 36 for use with the transporting and dumping device of the present invention is there shown. Container 36 is provided with a suitable bail 37 secured to the rear wall thereof and is provided with a drop bottom 38 reinforced by members 39 and pivoted or hinged at 40' along the lower edge of the rear wall of the container. Bottom 38 is provided with triangularly shaped upstanding portions 40 which fill suitably cutaway portions of the side walls of the container when bottom 38 is in closed position, upstanding portions 40 being provided with suitable studs 41 to receive hooks 35 of lifting chains 34. The front wall of container 36 is provided with reinforcing members 42 designed to act as skidways for the next container to be elevated. Pivotally mounted at the middle top of the front wall of the container is a suitable automatic hook or catch 43.

Figure 2:
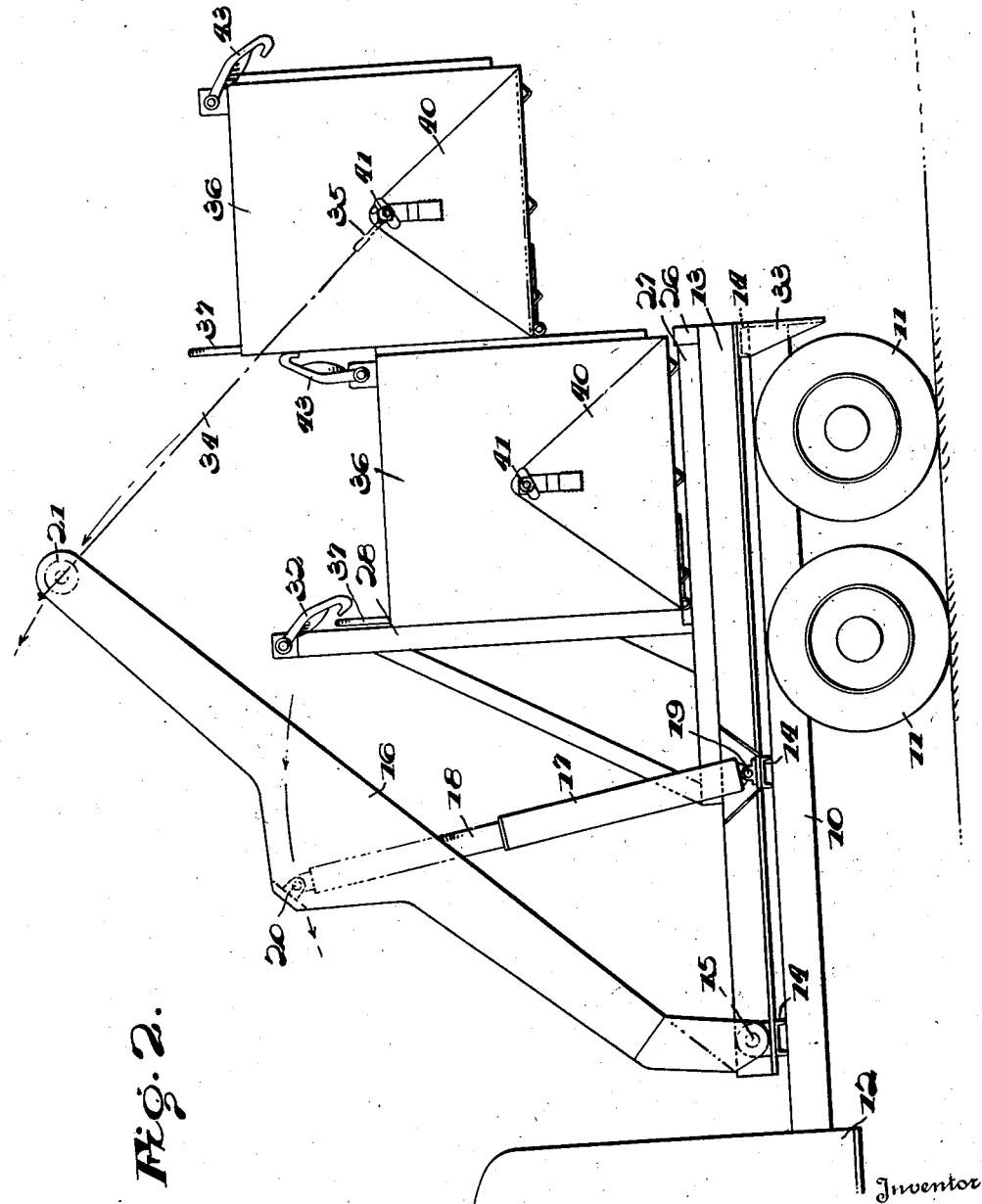
Fig. 2 is a side view of the embodiment of Fig. 1 showing the first transporting and dumping container in lowered position upon the vehicle and the second transporting and dumping container raised to its elevated position.

With the illustrative embodiment of the present invention set up as above described, when it is desired to transport and dump suitable transporting and dumping containers, platform 23 is moved to its rearward position adjacent stop 26 by piston 25 and skid frame 28 is moved to its rearward position on platform 23 adjacent stop 26 by pistons 31. Boom arms 16 are then lowered until hooks 35 of lifting chains 34 can be engaged with studs 41 of the first container 36. Boom arms 16 are then elevated by pistons 18 and the first container is raised upwardly over apron 33 and skid frame 28 to its elevated position as shown in Fig. 1. It is to be noted that in its elevated position the center of gravity of the first container is in a position rearwardly of the junction of lifting chains 34 and arm 21. The motive fluid is then bled from cylinders 30 and the weight of the first container and contents, swinging about arm 21 as the fulcrum, forces skid frame 28 forward in channel members 27 to a position adjacent the forward end of platform 23, as shown in Fig. 2. Boom arms 16 are then lowered until the first container rests upon channel members 27, the travel of skid frame 28 being so designed that in this position the reinforcing members 42 of the first container form an extension of apron 33.

Figure 3:
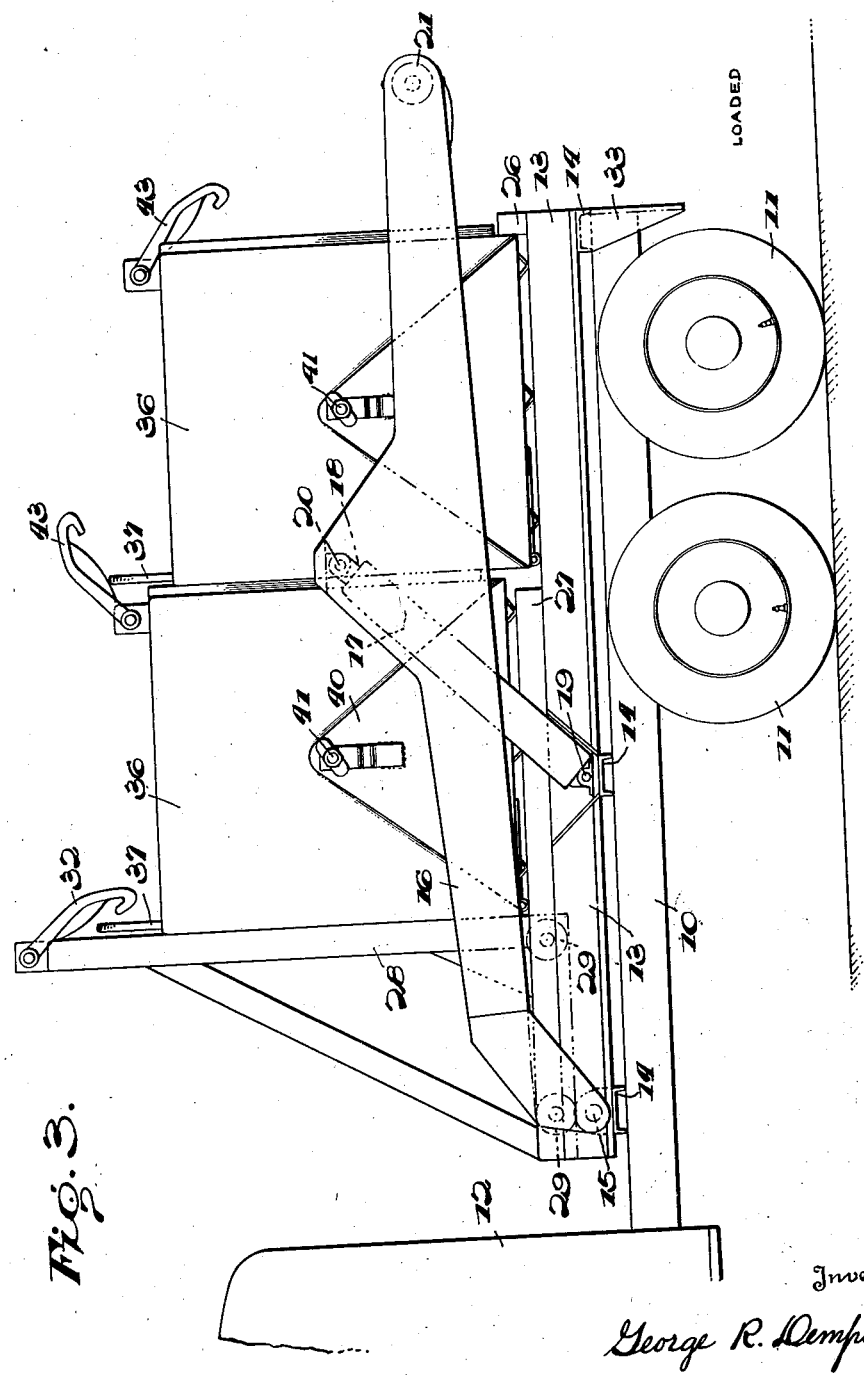
Fig. 3 is a side view of the embodiment of Fig. 1 showing both transporting and dumping containers in transporting position.

Hooks 35 of lifting chains 34 are then engaged with studs 41 of the second container and boom arms 16 raised raising the second container upwardly over apron 33 along the skidway formed by the reinforcing members 42 of the first container to its elevated position as shown in Fig. 2. It is to be noted that in its elevated position the center of gravity of the second container is in a position rearwardly of the arm 21. The second container is placed in its transporting position by bleeding the motive fluid from cylinder 24, the weight of the second container and its contents acting against the first container and skid frame 28 to move platform 23 to its forward position as shown in Fig. 3. Boom arms 16 are then lowered until the second container rests upon the top of channel members 13 and behind stop 26. Boom arms 16 may then be further lowered to act as side supports for the containers as shown in Fig. 3, to prohibit any lateral movement thereof. Skid frame 28 and stop 26 prohibit any forward or rearward movement of the containers during transportation.

Figure 4:
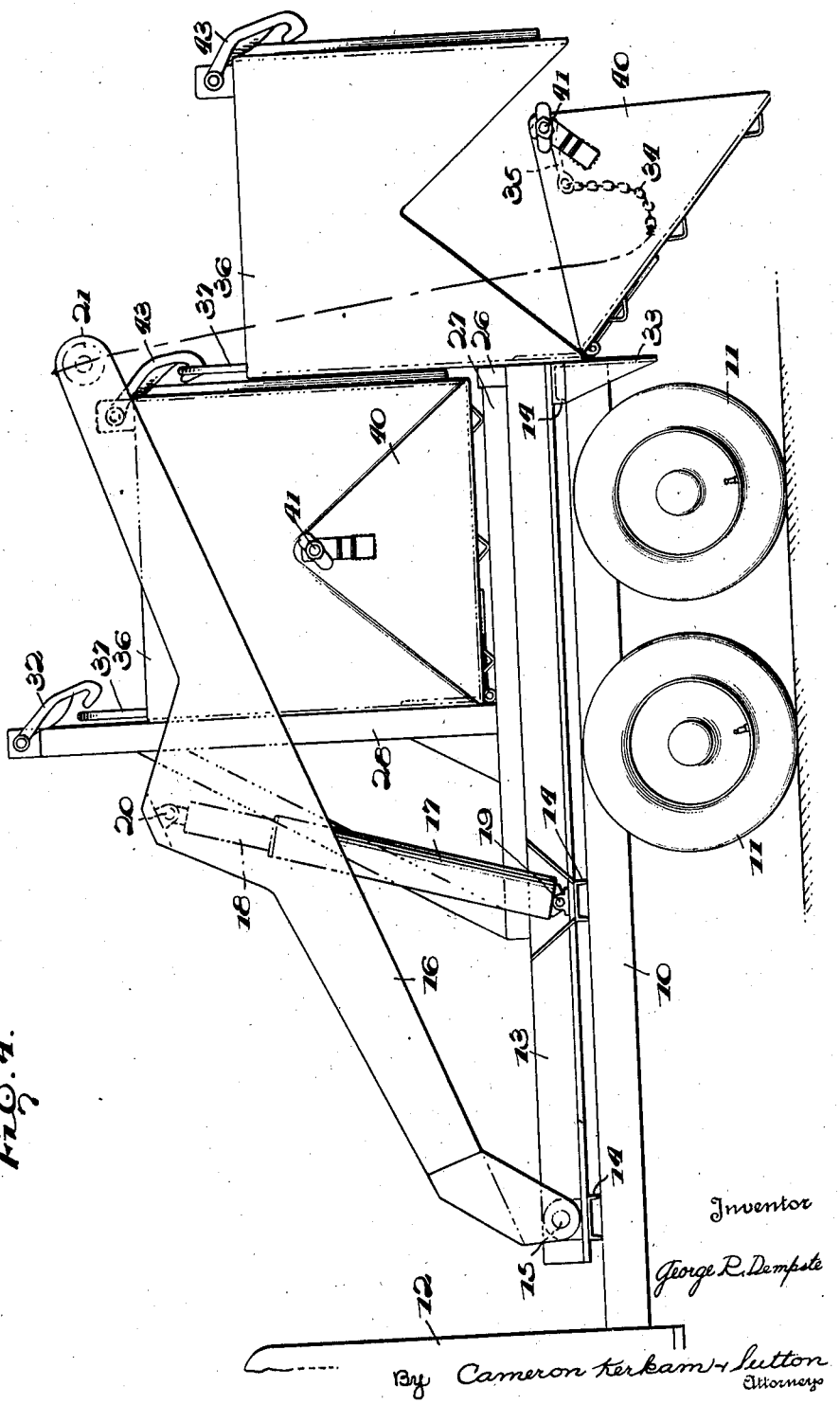
Fig. 4 is a side view of the embodiment of Fig. 1 showing the second transporting and dumping container in dumping position.
Figure 5:
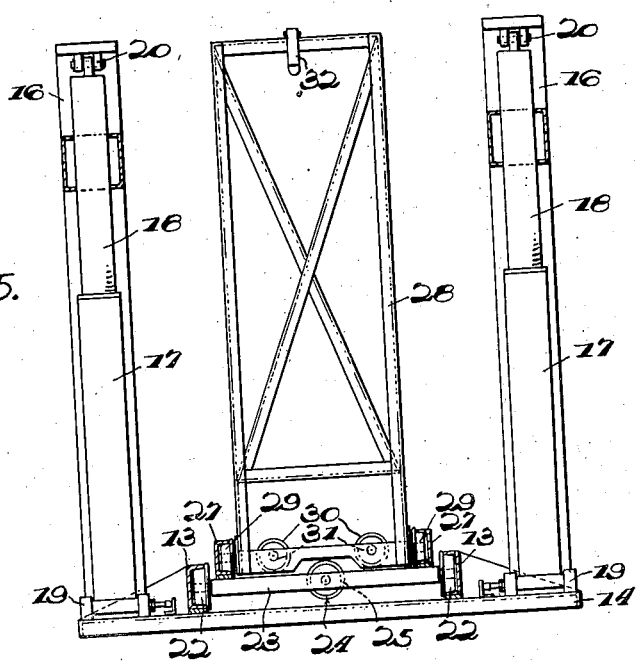
Fig. 5 is a view of the embodiment of Fig. 1, partly in section, as viewed from the right in Fig. 1 showing the relative location of the several parts.

When it is desired to dump the containers, hooks 35 of lifting chains 34 are engaged with studs 41 of the second container and boom arm 16 elevated lifting this container off of channel members 13 and upwardly along the reinforcing members 42 of the first container. Thereafter piston 25 is energized to move platform 23 to its rearward position adjacent stop 26 which in turn moves skid frame 28 and the first container to the rear forcing the second container out beyond the rear end of the vehicle chassis. When platform 23 reaches its rearward position the second container is lowered by lowering boom arms 16 until the automatic hook or catch 43 of the first container 36 engages its bail 37. Boom arms 16 are then further lowered releasing the tension on chains 34 and bottom 38 of the second container rotates about hinge or pivot 40' and dumps the contents of the container as shown in Fig. 4.

When the second container has been dumped boom arms 16 are raised until chains 34 close bottom 38 and until the automatic hook or catch 43 is disengaged. Thereafter boom arms 16 are lowered and the empty container set upon the ground and the hooks 35 disengaged from the studs 41.

The first container 36 is then dumped by engaging hooks 35 of chains 34 with its studs 41. Boom arms 16 are elevated and the first container raised off of channel members 27. Further elevation of the container engages bail 37 with the automatic hook or catch 32 mounted at the top of skid frame 28. Pistons 31 are then energized moving skid frame 28 to its rearward position adjacent stop 26. When this position has been reached boom arms 16 are lowered releasing the tension on chains 34 and the bottom 38 of the container rotates about hinge or pivot 40' and the contents of the container are dumped. After dumping, boom arms 16 are elevated and chains 34 close the bottom 38 of the container and lift the container along skid frame 28 until the automatic hook or catch 32 is disengaged from the bail 37. Thereafter boom arms 16 are lowered lowering the container 36 downwardly along skid frame 28 and apron 33 until the container rests upon the ground. Hooks 35 are then disengaged from studs 41 and suitable loaded containers may thereafter be raised to transporting position as above described.

It is now apparent that the present invention provides a novel transporting and dumping device in which the first transporting and dumping container elevated for transportation acts as a skid for the next transporting and dumping container elevated for transportation; in which one or more transporting and dumping containers can be individually transported and dumped; in which each transporting and dumping container elevated for transportation supports the adjacent transporting and dumping container during its dumping operation; in which a greatly increased load capacity is obtained without unduly increasing the bulk or the weight of the structure; and which is of simple construction, rugged, durable, easy to operate and maintain and relatively inexpensive to manufacture.

To those skilled in the art changes to or modifications of the above described illustrative embodiment of the present invention may now be suggested without departing from the scope of the invention. For example, any suitable type of transporting container may be used with the transporting device of the present invention and the type of container used need not be limited to the illustration described above.

It is further apparent that, if desired, the automatic hooks may be dispensed with and the containers not supported from the skid frame and from each other during dumping operations but lowered to the ground and there emptied. For example, if the novel transporting device of the present invention were to be used for the transporting of, say bricks, then a suitable container might be used which would be deposited on the ground at its destination and the bricks removed therefrom by hand or other suitable means. To determine the scope of the present invention, therefore, reference should be had to the appended claims.

What is claimed is:

1. In a transporting vehicle, means mounted on the vehicle chassis movable longitudinally thereof over the rear wheels of the vehicle, a skid frame carried by and longitudinally movable with respect to said movable means, and a boom pivotally mounted on the vehicle chassis, and adapted to elevate a container and place it on said means in position to act as a skid up which the next container elevated is raised.

2. In a transporting vehicle, means mounted on the vehicle chassis movable longitudinally thereof over the rear wheels of the vehicle, a boom pivotally mounted on the vehicle chassis and adapted to elevate containers, and a skid frame carried by and longitudinally movable over said movable means and up which the first container elevated is raised, said skid frame being movable by said first container to a position in which said first container in turn acts as a skid up which the next container elevated is raised.

3. In a transporting vehicle, a platform mounted on the vehicle chassis for movement backward and forward over the rear wheels of the vehicle, a boom pivotally mounted forwardly on the vehicle chassis and adapted to elevate containers, and a skid frame mounted for forward and backward movement on said platform and up which the first container elevated is raised, said skid frame being movable by the weight of said first container to a position in which said first container may be deposited on said platform and act as a skid up which the next container elevated is raised.

4. In a transporting vehicle, a track or way extending forward from the rear end of the vehicle above and across the rear axle thereof, a platform mounted for backward and forward movement on said track or way, a boom pivotally mounted at the forward end of said track or way and adapted to elevate containers, and a skid frame mounted for forward and backward movement on said platform and up which the first container elevated is raised, said skid frame being movable by said first container to a position in which said first container may be deposited on said platform and act as a skid up which the next container elevated is raised, and said next container acting on said first container by gravity to move the same to a position in which said next container may be deposited on said chassis.

5. In a transporting vehicle, a track or way extending forward from the rear end of the vehicle above and across the rear axle thereof, a platform mounted for backward and forward movement on said track or way, a power cylinder means for imparting movement to said platform along said track or way, a vertically swinging boom pivoted at the forward end of said track or way, power cylinder means for imparting vertical movement to said boom to elevate containers, a skid frame mounted for forward and backward movement on said platform and up which the first container elevated is raised, and a power cylinder means connected to said platform and skid frame for imparting movement to said skid frame, each container raised acting as a skid up which the next container elevated is raised.

6. In a transporting vehicle, a boom pivotally mounted on the vehicle chassis for elevating containers, and a skid frame mounted for movement forward and backward over the rear wheels of the vehicle and capable of occupying successive forward positions in one of which the first container is adapted to be elevated along the same, each container in turn acting on said skid frame to move the same forwardly to a position in which the first container to be elevated acts as a skid up which the next container elevated is raised.

7. In a transporting vehicle, means mounted on the vehicle chassis movable longitudinally thereof over the rear wheels of the vehicle, a boom pivotally mounted on the vehicle chassis, containers designed for elevation by said boom, and a skid frame carried by and longitudinally movable over said movable means and up which the first container elevated is raised, each container in turn acting as a skid up which the next container elevated is raised and having means supporting the next container during its dumping operation.

8. In a transporting vehicle, a platform mounted on the vehicle chassis for movement backward and forward over the rear wheels of the vehicle, a boom pivotally mounted forwardly on the vehicle chassis, containers to be elevated by said boom, a skid frame mounted for forward and backward movement on said platform and up which the first container elevated is raised, and means cooperating with said skid frame and platform whereby each container raised acts as a skid up which the next container elevated is raised, each container having means supporting the next container during its dumping operation.

9. In a transporting vehicle, a track or way extending forward from the rear end of the vehicle above and across the rear axle thereof, a platform mounted for backward and forward movement on said track or way, a boom pivotally mounted at the forward end of said track or way, containers to be elevated by said boom, and a skid frame mounted for forward and backward movement on said platform and up which the first container elevated is raised, and means cooperating with said skid frame and platform whereby each container raised is moved to a position for deposit on said vehicle thereafter acting as a skid up which the next container elevated is raised and having means supporting the next container during its dumping operation.

10. In a transporting vehicle, a boom pivotally mounted on the vehicle chassis, containers designed for elevation by said boom and a skid frame mounted for movement forward and backward over the rear wheels of the vehicle and capable of occupying successive forward position in one of which the first container is elevated along said skid frame, each container in turn acting as a skid up which the next container elevated is raised and having means supporting the next container during its dumping operation.

11. In a transporting vehicle, means mounted on the vehicle chassis movable longitudinally thereof over the rear wheels of the vehicle, a skid frame carried by and longitudinally movable over said movable means, a boom pivotally mounted on the vehicle chassis and adapted to elevate containers, and means for operating said skid frame so constructed and arranged that the weight of each container when elevated will move said skid frame forward and swing the container into position for lowering onto the vehicle.

12. In a transporting vehicle, means mounted on the vehicle chassis movable longitudinally thereof over the rear wheels of the vehicle, a boom pivotally mounted on the vehicle chassis and adapted to elevate containers, a skid frame carried by and longitudinally movable over said movable means up and which the first container elevated is raised, and means for operating said first named means and said skid frame so constructed and arranged that the weight of each container when elevated will move said skid frame and said first named means in succession forwardly on the vehicle and swing the container into position for lowering onto the vehicle.

13. In a transporting vehicle, a platform mounted on the vehicle chassis for movement backward and forward over the rear wheels of the vehicle, a boom pivotally mounted forwardly on the vehicle chassis for elevating containers, a skid frame mounted for forward and backward movement on said platform and up which the first container elevated is raised, and means for moving said skid frame rearwardly so constructed and arranged that the weight of the first container when elevated will move said skid frame forwardly on the vehicle while the container swings into position for lowering onto the vehicle.

14. In a transporting vehicle, a track or way extending forward from the rear end of the vehicle above and across the rear axle thereof, a platform mounted for backward and forward movement on said track or way, a boom pivotally mounted at the forward end of said track or way for elevating containers, a skid frame mounted for forward and backward movement on said platform and up which the first container elevated is raised, and means for moving said skid frame and platform forwardly and so constructed and arranged that the weight of each container when elevated will in succession move said skid frame and said platform forwardly while the container swings into position for lowering onto the vehicle.

15. In a transporting vehicle, a track or way extending forward from the rear end of the vehicle above and across the rear axle thereof, a platform mounted for backward and forward movement on said track or way, a power cylinder means for imparting movement to said platform along said track or way, a vertically swinging boom pivoted at the forward end of said track or way, a power cylinder means for imparting vertical movement to said boom, a skid frame mounted for forward and backward movement on said platform and up which the first container elevated is raised, and a power cylinder means connected to said platform and skid frame for imparting movement to said skid frame, said power means being so constructed and arranged that the weight of each container when elevated will move said skid frame and any containers on the vehicle forward and while the container swings into position for lowering onto the vehicle.

16. In a transporting vehicle, a boom pivotally mounted on the vehicle chassis for elevating containers, a skid frame mounted for movement forward and backward over the rear wheels of the vehicle and capable of occupying successive forward positions in one of which the first container is raised along said skid frame, each container in turn acting as a skid up which the next container elevated is raised and power cylinder means for operating said skid frame so constructed and arranged that the weight of each container when elevated will move said skid frame and any containers on the vehicle forward while the container swings into position for lowering onto the vehicle.

17. In a transporting vehicle, a track or way extending forward from the rear end of the vehicle above and across the rear axle thereof, a platform mounted for backward and forward movement on said track or way, a vertically swinging boom pivoted at the forward end of said track or way, a power cylinder means for imparting vertical movement to said boom, a skid frame mounted for forward and backward movement on said platform and up which the first container elevated is raised, a power cylinder controlling the forward movement of said platform and returning said platform to its rearward position and a power cylinder connected to said platform and to said skid frame controlling the forward movement of said skid frame and returning said skid frame to its rearward position.

18. A container for use with a transporting vehicle of the type described, having side, front and rear walls, a bail fixed to the rear wall, a drop bottom pivoted to the rear wall, and container lifting means secured to said drop bottom, said front wall being formed to provide means constituting a skidway.

19. A container for use with a transporting vehicle of the type described, having side, front and rear walls, a bail fixed to the rear wall, a drop bottom pivoted to the rear wall, and container lifting means secured to said drop bottom, said front wall being formed to provide means constituting a skidway and an automatic hook pivotally mounted at the middle top of the front wall.

20. In a transporting vehicle, a skid frame movable forward and backward over the rear wheels of the vehicle, boom arms pivoted at the sides of the vehicle chassis and adapted to elevate a first container along said skid frame and thereafter displace said skid frame and container, said boom arms adapted to deposit the containers on said vehicle, said boom arms being so constructed and arranged that in lowered position they embrace and restrain the containers on the vehicle.

GEORGE R. DEMPSTER.